Patented Aug. 1, 1933

UNITED STATES PATENT OFFICE 1,920,557

PROCESS OF PRODUCING AND TREATING SULPHOCYANATE SALTS

Emil Hene, Berlin-Grunewald, Germany

No Drawing. Application August 16, 1929, Serial No. 386,497, and in Germany November 19, 1928

2 Claims. (Cl. 23—75)

My invention is broadly concerned with a new process of producing sulphocyanate salts, for example potassium sulphocyanate (KCNS), in a molten condition from cheap and easily treatable substances. In this condition of a melt substance the sulphocyanate salts contained therein can be easily converted into various sulphocyanate compounds; it is further possible however, on account of the simple and convenient desulphurization of the sulphocyanate salts, to convert the same into valuable cyanide and alkali metal ferrocyanide compounds of a simple or complex nature. My invention therefore further consists specifically in an improved treatment of the sulphocyanate salts obtained, particularly in a process of producing cyanide and alkali metal ferrocyanide compounds from such sulphocyanate salts which can be carried out in a chemically and economically advantageous way as a so-called circulating process in which substantially all of the by-products obtained may be recovered and again used for certain steps of the total process, in order to partly or totally reproduce the substances required therefor.

My invention is based on the discovery made after numerous tests and experiments that sulphocyanate salts may be produced from compounds which contain carbon-nitrogen-combinations and which are derivatives of cyanamide, for example from dicyandiamide, carbamide, thiocarbamide and similar compounds, by melting these substances together with suitable sulphocompounds, such as sulphides, sulphydrates, polysulfides, thiocarbonates or the formation mixtures thereof. Such melting results in the production of the corresponding sulphocyanate salts at an escape, in some instances, of ammonia alone, of ammonia and nitrogen in some other instances and of nitrogen only in still other instances, the conversion taking place substantially after the formulæ:

$$3K_2S_2 + 3C_2N_4H_4 = 6KCNS + 4NH_3 + 2N,$$

or $$2KSH + C_2N_4H_4 = 2KCNS + 2NH_3$$

The sulphocyanate compounds contained in the meltings thus obtained can be gained as such by a dissolution with water with or without subsequent recrystallization, they can however also be transformed by a conversion with other metal salts into the sulphocyanides of such metals, while being in solution. The sulphocyanides may be produced by dissolving in water a barium sulphocyanide melt obtained by melting together barium sulphite and sulphur with dicyandiumide and adding sodium chloride whereby the barium chloride is precipitated and the sodium sulphocyanide remains in solution. The sulphocyanate compounds can be converted also directly into the valuable cyanides or ferrocyanides by heating them with suitable materials, for example iron, hydrogen, carbon, etc., as this is well known to those familiar with this particular art. If, for example, 250 kg of commercial barium sulphide (BaS), 32 kg of sulphur and 84 kg of dicyandiamide are heated to 400–500° C. a melt is obtained following the formula:

$$3BaS + 3S + 3C_2N_4H_4 = 3Ba(CNS)_2 + 2N + 4NH_3.$$

By dissolving this melt in water barium sulphocyanide is obtained which in concentrated solution can be converted with sodium chloride into barium chloride and sodium sulphocyanate, the barium chloride being precipitated whereas the small rest of the barium which remains in the solution can be precipitated by sulphates, carbonates, etc.

I can however also proceed in the following manner: Dicyandiamide is cautiously introduced into a melt of alkali sulphydrate or solid alkali sulphydrate is mixed with dicyandiamide and heated, whereby alkali sulphocyanate is obtained following the formula:

$$2KSH + C_2N_4H_4 = 2KCNS + 2NH_3.$$

If a suitable metal is added to this melt, for instance an adequate quantity of iron chips, and the mixture heated for some time to 500–600° C., potassium cyanide and sulphuret of iron are obtained, which, as is known, can in hot solution be converted into yellow prussiate following the formulæ:

$$6KCNS + 6Fe = 6KCN + 6FeS,$$

and $$6KCN + FeS = K_4Fe(CN)_6 + K_2S.$$

By decomposing the sulphuret of iron with sulphuric acid green vitriol and hydrogen sulphide may be obtained. This hydrogen sulphide can be used for a new production of potassium sulphydrate, for instance from potassium sulphate and lime, or from potash lye. It may also be used for reconverting into potassium sulphydrate the potassium sulphide obtained upon evaporization of the yellow prussiate.

I may even proceed to completely or partly convert the yellow prussiate with green vitriol into Berlin blue (ferrocyanide of iron), recovering thereby a potassium sulphate solution which also can most economically be used for a repeated production of potassium sulphydrate with lime and hydrogen sulphide.

I claim:

1. The process of producing sulphocyanate salts comprising melting together nonaqueous sulphydrates and dicyandiamide at a temperature between 200° and 500° C.

2. The process of producing sulphocyanate salts comprising melting together nonaqueous alkali sulphydrates and dicyandiamide at a temperature between 200° and 500° C.

EMIL HENE.